United States Patent Office 2,778,972
Patented Jan. 22, 1957

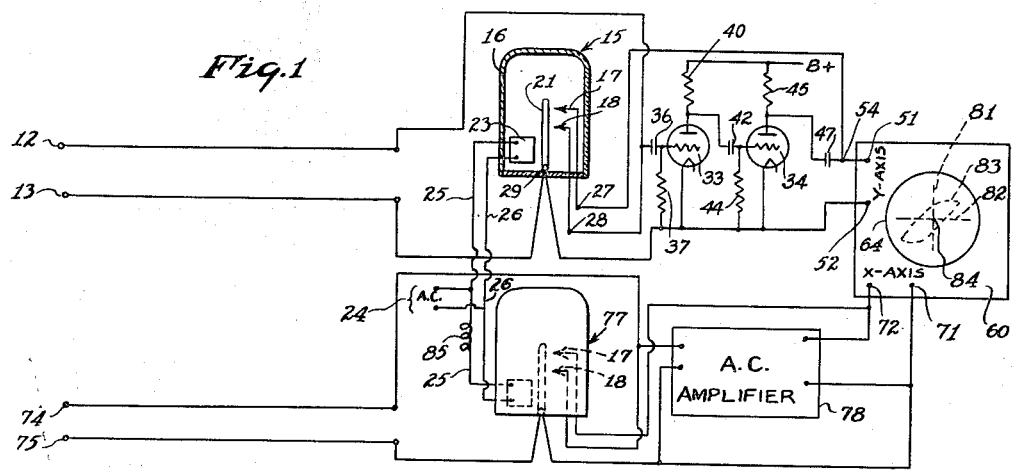

2,778,972
APPARATUS FOR INDICATING VARIABLES ON OSCILLOGRAPH WITH X AND Y AXES

Greer Ellis, Pelham, N. Y.

Application March 10, 1953, Serial No. 341,576

5 Claims. (Cl. 315—24)

This invention relates to apparatus for indicating variables on oscillograph screens with X and Y axes indicated by the oscillograph beam. The variables indicated may be any variables, such as load, acceleration, force, pressure, voltage, current, or any force or condition which can be transferred to an oscillograph voltage by suitable transducers or other equipment.

The term "oscillograph" is used herein in a broad sense to indicate either a cathode ray type of impulse indicating instrument whether equipped with a screen or photographic strip or any other type of varying voltage indicating or recording devices equipped to respond in two independent directions to two simultaneous signals.

It is a common practice to construct oscillographs so that they have X and Y axis terminals whereby variable signals can be made to oscillate the oscillograph beam vertically or horizontally; or variable signals can be connected to both sets of terminals simultaneously so as to produce a beam travel having both X and Y components. The effectiveness of using oscillographs in this way has been reduced, however, by the fact that the paths traced by the beam are not definitely oriented with respect to any X or Y axes.

It is an object of this invention to provide improved apparatus for supplying signals to oscillographs, and for supplying variable signals in such a way that a zero line is traced on the oscillograph screen at the same time that a path of variation of the variable is indicated. When two variables are supplied to the oscillograph, with one signal deflecting the beam in a horizontal direction while the other deflects it in a vertical direction, the two zero lines supply X and Y axes for the path traversed by the beam under the influence of the two variables.

Another object of the invention is to improve the flexibility of oscillographs in recording combinations of variable signals. It has been known to trace the movement of variables with a long time cycle, such as a time cycle of 10 seconds. Satisfactory results have also been obtained with extremely short time cycles of one-tenth second or less. However, there have been difficulties encountered in the indicating of signal changes longer than about one-tenth second and too short for the slower static method.

This difficulty has arisen because direct current amplifiers are often not satisfactory with the weak signals obtained from strain gages and similar transducers. Direct current amplifiers often lack stability where the signal variation is less than about one millivolt, unless the time cycle is extremely short. Alternating current amplifiers have not been satisfactory for long cycles because of the limited time constants of such alternating current equipment. For example, an alternating current amplifier with a time constant of about one second should not be used for a signal variation cycle of more than one-tenth second or the results obtained will be distorted by the time constant of the amplifier.

One of the advantages of this invention is that it permits either direct current or alternating current amplifiers to be used with any signal cycle and with X and Y axes indicated by the oscillograph beam without distortion.

Other objects, features and advantages of the invention will appear or be pointed out as the description proceeds.

In the drawing, forming a part hereof, in which like reference characters indicate corresponding parts in all the views;

Figure 1 is a diagram showing the invention connected with an oscillograph and using alternating current amplifiers;

Figure 2 is a diagram showing the way in which the invention is connected with an oscillograph through direct current amplifiers;

Figure 3 is a chart showing variations of the position of the oscillograph beam when the cycles of the X and Y circuits are in phase;

Figures 4, 5 and 6 are charts showing the variations of the positions of the oscillograph beam when the cycles of the X and Y circuits are out of phase by 45°, 90°, and 180°, respectively.

The circuit shown in Figure 1 includes input terminals 12 and 13 that are connected to any source of direct current signal which is to be amplified for operating an oscillograph, but the apparatus is intended primarily for feeble voltages such as are received from strain gages. Some other devices from which power is amplified by this invention are thermo-couples and photo-electric cells. These devices are mentioned merely by way of illustration, and it will be understood that the invention can be used for amplifying signals from other sources.

There is a vibrator switch 15, commonly known as a "chopper," in the circuit. This vibrator switch includes a housing 16 within which there are two contacts, 17 and 18, and a single reed 21. The contacts 17 and 18 are on the same side of the reed 21 so that when the reed swings in one direction, the reed touches both of the contacts 17 and 18 at the same time. The reed 21 is vibrated back and forth, between the position in which it touches the contacts 17 and 18, and another position in which the reed is spaced from these contacts, by a motor or vibrator coil 23. The motor coil 23 is within the housing 16 and is connected with an alternating-current supply line 24 by conductors 25 and 26.

The contacts 17 and 18 are connected with terminals 27 and 28, respectively, of the vibrator switch 15; and the fixed end of the reed 21 is connected with a terminal 29 of the switch. The operation of such vibrator switches are well known in the art.

The circuit shown in Figure 1 includes also an alternating current amplifier unit comprising two electronic tubes 33 and 34 connected so as to provide two stages of amplification of the power supplied to the input terminals 12 and 13. The first stage is obtained from the tube 33 which has its grid connected with the terminal 12 through a blocking condenser 36 and suitable conductors. The cathode of the tube 33 is connected with the terminal 13, and there is a grid leak 37 connected across the circuit in accordance with conventional practice.

The voltage acting in the plate circuit of the tube 33 is coupled to the grid of the second tube 34 by a resistance 40, and there is a blocking condenser 42 connected between the grid of the tube 34 and the plate of the first tube 33.

The tube 34 has a grid leak 44, and has its plate circuit connected with a resistance 45, in the B battery circuit, and a blocking condenser 47 in a circuit that leads to output terminals 51 and 52 of the amplifier apparatus.

The contact 17 of the vibrator switch 15 is connected with the terminal 51 at a connection 54 beyond the last condenser 47 of the amplifier unit. The terminal 28 of the vibrator switch 15 is connected in the circuit with the input terminal 12 ahead of the first condenser 36 of the amplifier unit. With these shunt circuits, it will be apparent that when the vibrator switch 15 is operating as a chopper, both the input and output of the amplifier unit are short circuited when the reed 21 touches the contacts 17 and 18.

The output terminals 51 and 52 of the amplifier apparatus are connected with a cathode-ray oscillograph 60 of the type capable of displaying direct-current as well as alternating current signals. If the signals supplied to the input terminals 12 and 13 are not sufficiently strong to drive the oscillograph 60 with only two stages of amplification, then the amplifier unit can be made with more stages of amplification.

The oscillograph 60 has other terminals 71 and 72, which control the horizontal movement of the oscillograph beam. Another variable signal is supplied to terminals 74 and 75 of a circuit connected with the X axis terminals 71 and 72. This circuit is similar to the signal circuit that supplies voltage impulses to the Y axis terminals 51 and 52. The vibrator switch or chopper for the X axis circuit is indicated by the reference character 77 and the amplifier is shown by a block diagram element 78.

It will be understood that the X axis circuit operates in the same way as already described for the Y axis. When the X axis circuit is short circuited, the variations in the signals from the Y axis circuit trace a line 81 on the oscillograph face. Since the value of X is zero along all points of this line 81, the line constitutes the Y axis for the chart shown on the oscillograph screen. Correspondingly, when the Y axis is short circuited, the variations in signals from the X axis circuit trace a line 82 on which all values of Y are zero. This line 82, therefore, constitutes the X axis for the graph.

When the signals are received from the X axis circuit and the Y axis circuit simultaneously, the oscillograph beam traces a line 83 which represents the combined values of the variables from the respective circuits at different times throughout the signal cycle. Whenever the X axis circuit and the Y axis circuit are shorted simultaneously, the oscillograph beam moves to a center position 83 at the origin of the graph.

The operation of the signals from the different circuits is affected by the phase relation between the vibrator switches 15 and 77, as will be more fully explained in connection with Figures 3 to 5. In connection with the wiring diagram in Figure 1, however, it should be noted that the vibrator switch 77, although similar in construction to the vibrator switch 15, is connected to alternating-current supply line 24 through an inductance 85 placed in series with conductor 25. A capacitor can be used in place of the inductance 85, and either the inductance or the capacitor can be connected in series with either of the conductors 25 and 26, or both; the inductance 85 being merely representative of means for causing a difference in phase in the operation of the vibrator siwtches 15 and 77. The amount of inductance 25 can be changed or a capacitor can be substituted for the inductance in order to change the difference in phase-angle relation between the operation of the vibrator switches 15 and 77.

Figure 2 shows a construction in which direct current amplifiers are used in place of the alternating current amplifiers of Figure 1. Corresponding parts in Figure 2 are indicated by the same reference characters as in Figure 1. A direct current amplifier 86 is located between the vibrator switch 15 and the Y axis terminals 51 and 52 of the oscillograph 60. A similar direct current amplifier 87 is located between the vibrator switch 77 and the X axis terminals 71 and 72 of the oscillograph 60. The difference between the circuit shown in Figure 2 and that shown in Figure 1 is that the vibrator switches 15 and 77 have their contacts 17 removed so that they short circuit only the inputs of the amplifiers 86 and 87. Since the time constant of a direct current amplifier is infinite, it is not necessary to short circuit both the inputs and outputs of the amplifiers 86 and 87 in order to avoid distortion of the zero lines on the oscillograph screen.

The circuits in Figure 2 can be modified so as to short circuit the output of each of the amplifiers 86 and 87, instead of the input. In order to short circuit the outputs, the output short circuit connections of Figure 1 can be used.

Figure 3 shows the way in which the variable signals and vibrator switches operate together to influence the movement of the oscillograph beam when the signal cycles are in phase. In this chart, as well as in the charts of Figures 4–6, the vibrator switch operates in such a way that the amplifier is short circuited only 25% of the time. This gives ample indications for the zero lines and has the advantage of giving the fuller signal variation indications. On the top line of Figure 3, X axis signal is shown as supplied to the oscillograph terminals for 270° of the signal cycle, and the circuit is then short circuited to supply a zero signal for the remaining 90° of the cycle. On the second line of Figure 3 the same situation is shown for the signal from the Y axis circuit, and this signal cycle is in phase with the X axis circuit, the signal periods and short circuit periods occurring in synchronism.

Along the bottom line of Figure 3, the combined effect of the signals shown on the two upper lines is indicated. During 270° of the cycle, the oscillograph indicates the composite value of the variables X and Y. During 90° of the signal cycle the oscillograph shows a zero value for both the X and Y circuits, and this will produce only a dot at the point where the X and Y axes should cross each other; but it will be evident from the chart that no X and Y axes are traced on the oscillograph because of the fact that the cycles of the X and Y circuits are in phase with one another.

The top line of the chart in Figure 4 shows the period during which a signal is supplied to the oscillograph from the X axis circuit. This period is 225° of the cycle. The circuit is then shorted for 90° of the cycle, and the signal is then supplied to the oscillograph again for the remaining 45° of the cycle. The second line of the chart in Figure 4 shows the period during which signals are supplied to the oscillograph from the Y axis circuit. These signals are supplied for the first 270 degrees of the cycle and the circuit is then shorted for the final 90 degrees of the cycle, as in the case of Figure 3. Thus, the cycle of the X axis circuit lags the cycle of the Y axis circuit by 45 degrees of phase difference.

Adding the signal periods of the first two lines of Figure 4 together produces the results shown on the third line of this chart. For the first 225 degrees of the cycle, the beam of the oscillograph follows a path indicating the combined effect of the two variables of the X and Y circuits.

When the X axis circuit is shorted at the 225 degree point, the beam will trace a Y axis on the screen along the range of variation of the Y signal during the next 45 degrees of the cycle. With the shorting of the Y axis at the 270-degree point in the cycle, the oscillograph beam will move to the origin at which the X and Y axes cross and will remain there for the next 45 degrees.

At the 315-degree point of the cycle, the X axis circuit again supplies its variable signal to the oscillograph, but the Y axis circuit remains shorted until the end of the cycle. During this final 45 degrees of the cycle, the beam remains on the X axis and traces the X axis within the range of variation of the variable signal supplied to the oscillograph by the X axis circuit.

Figures 5 and 6 are similar to Figure 4 except for differences in the angle by which the cycles of the two variables are out of phase. In Figure 5, the cycle of the Y axis circuit lags that of the X axis circuit by 90 degrees, and in Figure 6 by 180 degrees.

In neither Figure 5 nor Figure 6 is there any time when both of the circuits are shorted simultaneously and there is no time, therefore, when the beam will rest at the origin. On the other hand, however, the length of time that the beam spends tracing the X and Y axes is increased. This allows for more variation in the signals during the axis-tracing time and improves the length of the axes thus obtained.

In the charts shown in Figures 3–6, the cycles of the choppers are equal in both circuits. This result is obtained when the choppers are powered from a common alternating current supply, but if the choppers operate independently, as occurs when they are powered by batteries, then the cycles are not of equal length and there will be beats and irregular phase relations. The results are the same in principle as already described, and quite similar in practice because of the fact that the cycles are so short that average results are controlling.

Various changes and modifications can be made in the illustrated embodiments without departing from the invention as defined in the claims.

I claim as my invention:

1. Apparatus for supplying signals to X and Y axis terminals of an oscillograph, said apparatus including a first circuit that supplies signals to the X axis terminals, a second circuit that supplies signals to the Y axis terminals, an amplifier in each of the circuits, repetitive switching means for each circuit movable between two positions, in one of which the signals from the respective circuits are supplied to the oscillograph, and in the other of which the signal from the circuit of that switching means is shut off from the oscillograph and means to produce a phase difference between the operations of the repetitive switching means in the respective circuits.

2. Apparatus for producing X and Y axes on an oscillograph which is measuring the relation of two variables by signals supplied to X and Y axis terminals of the oscillograph, said apparatus comprising a first signal circuit connected with the X axis terminals of the oscillograph, a second signal circuit connected to the Y axis terminals of the oscillograph, an amplifier in each of the circuits, repetitive switching means in each of the circuits movable between two positions, in one of which the switching means short-circuits the amplifier so that the signal of the other circuit traces a zero line on the oscillograph, and means to produce a phase difference between the operations of the repetitive switching means in the respective circuits.

3. The combination with a cathode ray oscillograph having X axis terminals and Y axis terminals, of a first signal circuit that supplies variable signals to the X axis terminals, a second signal circuit that supplies variable signals to the Y axis terminals, an amplifier in each of the signal circuits including an alternating current amplifier in at least one of the signal circuits, repetitive switching means in each of the signal circuits movable between two positions, in one of which the variable signal is supplied to the oscillograph terminals and in the other of which the amplifier is short-circuited, the switching means for the alternating current amplifier being connected with both the input and the output of the amplifier and operative in one position to short-circuit simultaneously, both the input and the output of the amplifier, and means to produce a phase difference between the operations of the repetitive switching means in the respective signal circuits.

4. Apparatus for indicating the correlation of two variable signals with reference to X and Y axes, said apparatus including a cathode ray oscillograph having a face on which a beam indicates variations in signals supplied to X axis terminals and Y axis terminals of the oscillograph, a first signal circuit that supplies signals to the X axis terminals, a second signal circuit that supplies signals to the Y axis terminals, a direct current amplifier in each of the signal circuits, repetitive switching means in each circuit movable into one position to supply signals to the oscillograph, each amplifier having input and output connections, one of which is connected with the repetitive switching means at a position to be short-circuited when the repetitive switching means is in a second position different from that in which it supplies signals to the oscillograph, and means to produce a phase difference between the operations of the repetitive switching means of the respective circuits so that the signals from one circuit trace a zero line on the oscillograph face while the other signal circuit is short-circuited.

5. A combination comprising a cathode ray oscillograph having a face and having X axis terminals and Y axis terminals to which signals are supplied for shifting the oscillograph beam horizontally and vertically in accordance with the signals supplied to the X axis terminals and the Y axis terminals, respectively, a first circuit connected with the X axis terminals, a second circuit connected with the Y axis terminals, an alternating current amplifier in each of the circuits, repetitive switching means in each circuit and each of which is operable between two positions, in one of which it short-circuits both the input and the output of the alternating current amplifier in the circuit with it, and means to produce a phase difference between the operations of the repetitive switching means in the respective circuits.

References Cited in the file of this patent

UNITED STATES PATENTS

| 1,592,274 | Kipping | July 13, 1926 |
|---|---|---|
| 2,165,025 | Baldwin | July 4, 1939 |
| 2,278,641 | Bond | Apr. 7, 1942 |
| 2,369,799 | Robinson | Feb. 20, 1945 |
| 2,548,276 | Weisbecker | Apr. 10, 1951 |